UNITED STATES PATENT OFFICE.

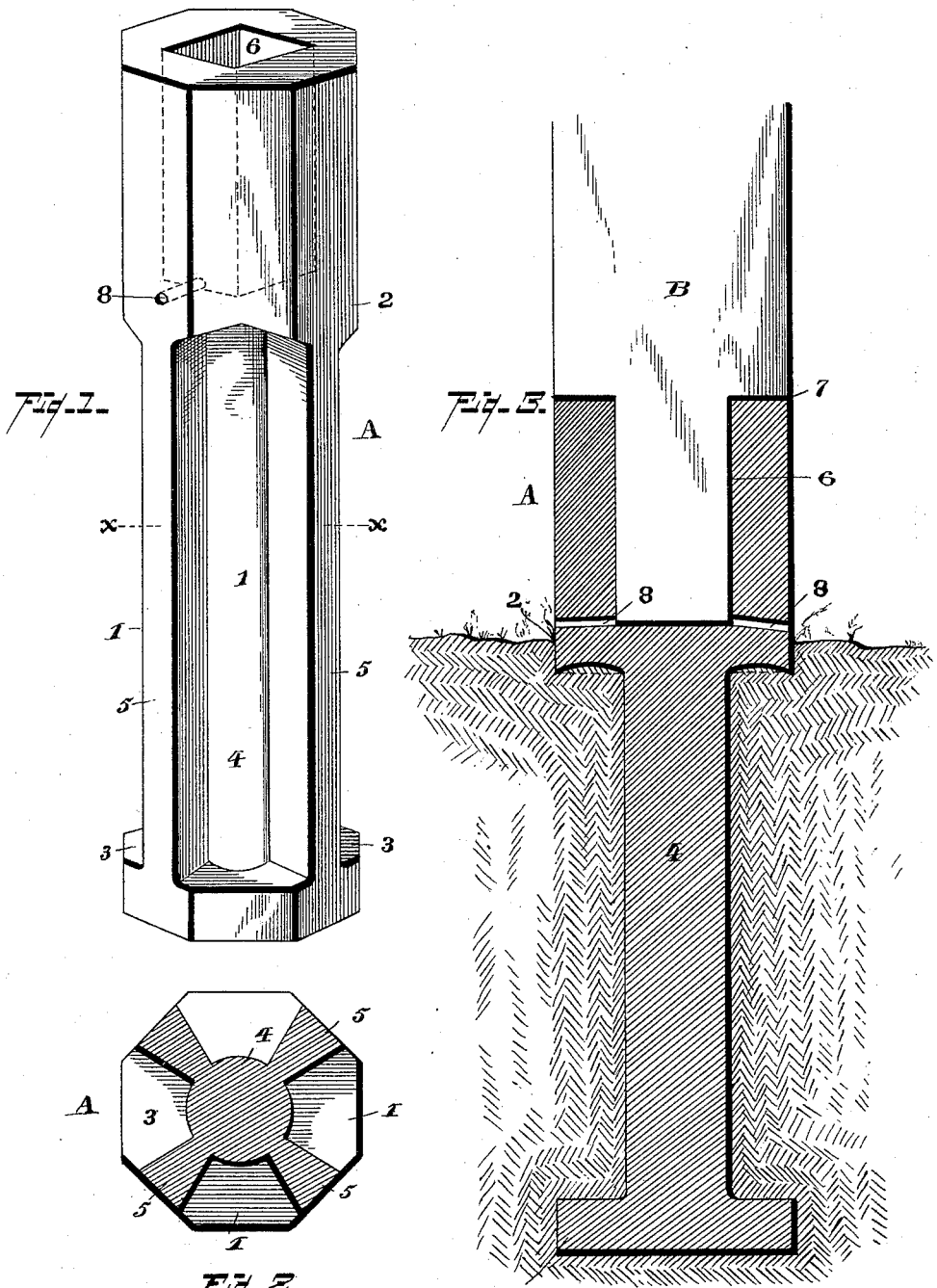

LAWRENCE HEILAND, OF DEFIANCE, OHIO.

FENCE-POST HOLDER.

SPECIFICATION forming part of Letters Patent No. 432,043, dated July 15, 1890.

Application filed April 23, 1890. Serial No. 349,118. (No model.)

*To all whom it may concern:*

Be it known that I, LAWRENCE HEILAND, a citizen of the United States of America, residing at Defiance, in the county of Defiance and State of Ohio, have invented certain new and useful Improvements in Fence-Post Holders, of which the following is a specification, reference being had therein to the accompanying drawings.

My invention relates to an improvement in fences; and it has for its object to provide a cheap, effective, and durable holder for the posts.

The invention will first be described in connection with the accompanying drawings, and then pointed out in the claims.

Figure 1 of the drawings is a perspective view of my improved fence-post holder. Fig. 2 is a horizontal section of the same, taken on the line $x\ x$, Fig. 1. Fig. 3 is a vertical section of the post-holder in the ground, and also a broken elevation of a post in place therein.

Referring to the drawings, A represents the fence-post holder, made, preferably, of clay, cement, metal, or other suitable material not subject to decay, and of a polygonal form, the holder shown in the drawings being octagonal.

In the sides or faces of the holder are formed longitudinal recesses 1, the width of each of which at its outer extremity covers one face and about one-third of each of the adjoining faces, the sides of the recesses being formed on lines radiating from the axis of the holder, thus leaving cuneal webs or partitions 5 in the center of each alternate face, as clearly seen in Fig. 2. In length these recesses extend from a point a short distance below the ground-line at 2 to near the lower end of the holder, leaving flat bases 3, for a purpose which will hereinafter appear, and in depth they extend inward preferably a little more than half the distance to the center, leaving a central uncut portion 4, which is cylindrical, as shown.

In the upper portion of the post-holder there is formed a socket 6 for receiving the lower end of the fence-post B, which is preferably shouldered, as at 7, and at the bottom of the socket there are formed lateral openings 8 for the escape of any water that may get into the socket. In setting this post-holder a hole of the required depth is dug and the holder placed therein down to the ground-line 2. The loose earth is then firmly tamped around it and into the recesses, filling them solidly. It will be evident that when this is properly done the post-holder will be secure against movement in any direction, as the bases will prevent upward heaving by frost, the tops of the recesses will prevent sagging or settling, and the webs will prevent lateral movement and turning, the wedge shape and comparatively broad faces of these webs giving them a firm hold upon and a good bearing against the tamped earth. After the holder is set in the ground the post is placed therein, the shouldered portion filling the socket neatly and being preferably tarred or pitched.

Having thus described my invention, what I claim as new, and desire to secure by Letters Patent, is—

1. A fence-post holder of polygonal shape having longitudinal recesses in its faces, flat bases at the lower ends of the recesses, and cuneal webs between the recesses, substantially as described, and for the purposes stated.

2. A fence-post holder of polygonal shape having longitudinal recesses, each of which at its outer extremity extends entirely across one face and part way across each of the adjoining faces, cuneal webs between the recesses, a flat base at the bottom of each recess, a socket in the top of the holder, and one or more lateral openings leading from the bottom of the socket, as and for the purposes set forth.

In testimony whereof I affix my signature in presence of two witnesses.

LAWRENCE HEILAND.

Witnesses:
W. D. HILL,
W. H. HUBBARD.